UNITED STATES PATENT OFFICE.

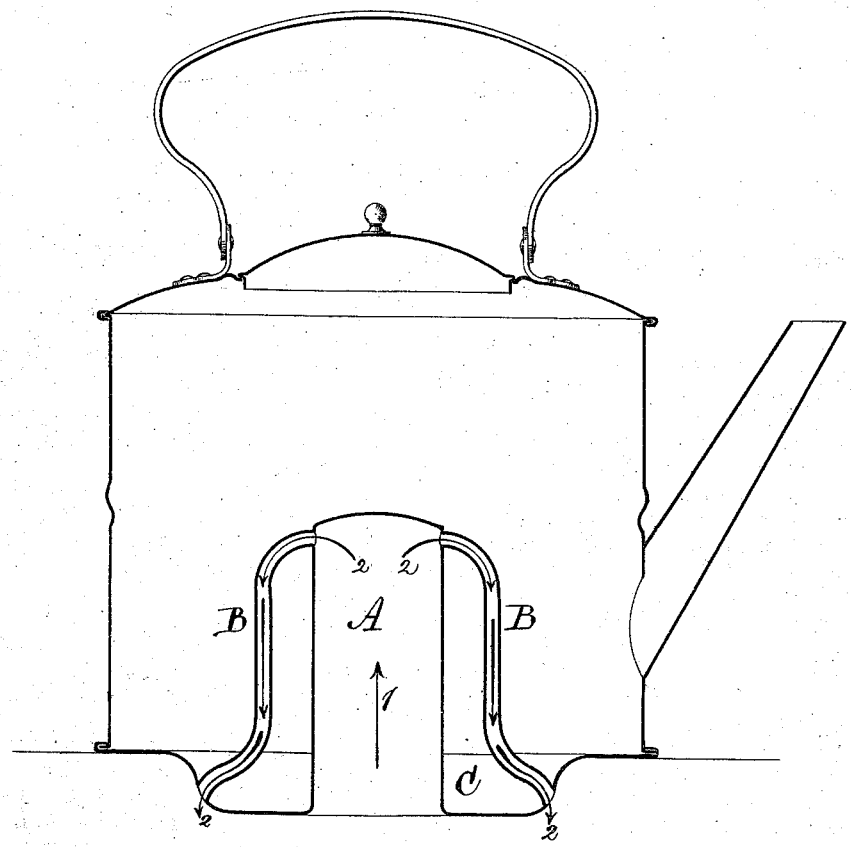

DAVID JONES, OF YONKERS, NEW YORK.

IMPROVEMENT IN KETTLES.

Specification forming part of Letters Patent No. 156,573, dated November 3, 1874; application filed February 7, 1874.

*To all whom it may concern:*

Be it known that I, DAVID JONES, of Yonkers, in the county of Westchester and State of New York, have invented certain Improvements in Culinary Boilers, of which the following is a specification:

This invention consists of a kettle or vessel having a depressed bottom and a vertical chamber open at its lower end, said chamber being provided with tubes, which communicate with the top of the chamber and the bottom of the vessel, so that when the kettle is placed over a pot-hole in a stove the heated air and gases from the fire rise in the chamber, and descend through the pipes back into the fire-chamber, and thus a continuous circulation of the heated air and gases is produced, and the heating-capacity of the vessel increased.

The accompanying drawing represents a central vertical section of a kettle embodying my invention.

A represents a chamber, which may be of any suitable form, preferably cylindrical. The lower end of this chamber is open, and is attached to an opening of corresponding shape and size in the bottom of the kettle by soldering or otherwise. Two or more tubes, B, lead from the chamber A, near its upper end, to the depressed portion C of the bottom of the vessel.

When the kettle is placed over a pot-hole in the top of a stove, the heated air and gases from the fire rise in the chamber A, as indicated by the arrow 1, and descend through the tubes B, as indicated by the arrows 2, and thus a continuous current of heated air and gas is produced, and the heating capacity of the kettle is increased.

What I claim as new, and desire to secure by Letters Patent, is—

The kettle or vessel having the vertical chamber A and depressed bottom C, said vertical chamber being provided with the tubes B, which communicate with the same and the bottom of the vessel, all being constructed and combined substantially as described, for the purpose herein set forth.

DAVID JONES.

Witnesses:
J. W. MITCHELL,
BAILEY HOBBS.